United States Patent [19]

Hendriks

[11] Patent Number: 5,538,668
[45] Date of Patent: Jul. 23, 1996

[54] ANTIFOAM COMPOSITION FOR AQUEOUS STARCH PAPER COATING SYSTEMS

[75] Inventor: William A. Hendriks, Jacksonville, Fla.

[73] Assignee: Betz PaperChem Inc., Jacksonville, Fla.

[21] Appl. No.: 233,603

[22] Filed: Apr. 19, 1994

[51] Int. Cl.$^6$ ..................................................... B01D 19/04
[52] U.S. Cl. ........................................... 252/321; 252/358
[58] Field of Search .................................. 252/321, 358

[56] References Cited

U.S. PATENT DOCUMENTS

| | | | |
|---|---|---|---|
| 3,549,539 | 12/1970 | Mallows | 252/358 |
| 4,076,648 | 2/1978 | Rosen | 252/358 |
| 4,229,547 | 10/1980 | Cohen et al. | 521/69 |
| 4,477,371 | 10/1984 | Huber et al. | 252/358 |
| 4,950,420 | 8/1990 | Svarz | 252/321 |
| 4,968,448 | 11/1990 | Svarz | 252/358 |
| 5,320,777 | 6/1994 | Nguyen et al. | 252/358 |
| 5,425,899 | 6/1995 | Nguyen et al. | 252/321 |

FOREIGN PATENT DOCUMENTS

| | | |
|---|---|---|
| 0537018 | 4/1993 | European Pat. Off. . |
| 1557086 | 2/1969 | France . |

OTHER PUBLICATIONS

Derwent Abstract, AN—68 —07238Q/00, (1968).

*Primary Examiner*—Richard D. Lovering
*Assistant Examiner*—Daniel S. Metzmaier
*Attorney, Agent, or Firm*—Alexander D. Ricci; Matthew W. Smith

[57] ABSTRACT

A composition and method for controlling foam in the coating solution of a papermaking operation consisting of a polyether surfactant and polyethoxylated sorbitol hexaoleate.

2 Claims, 3 Drawing Sheets

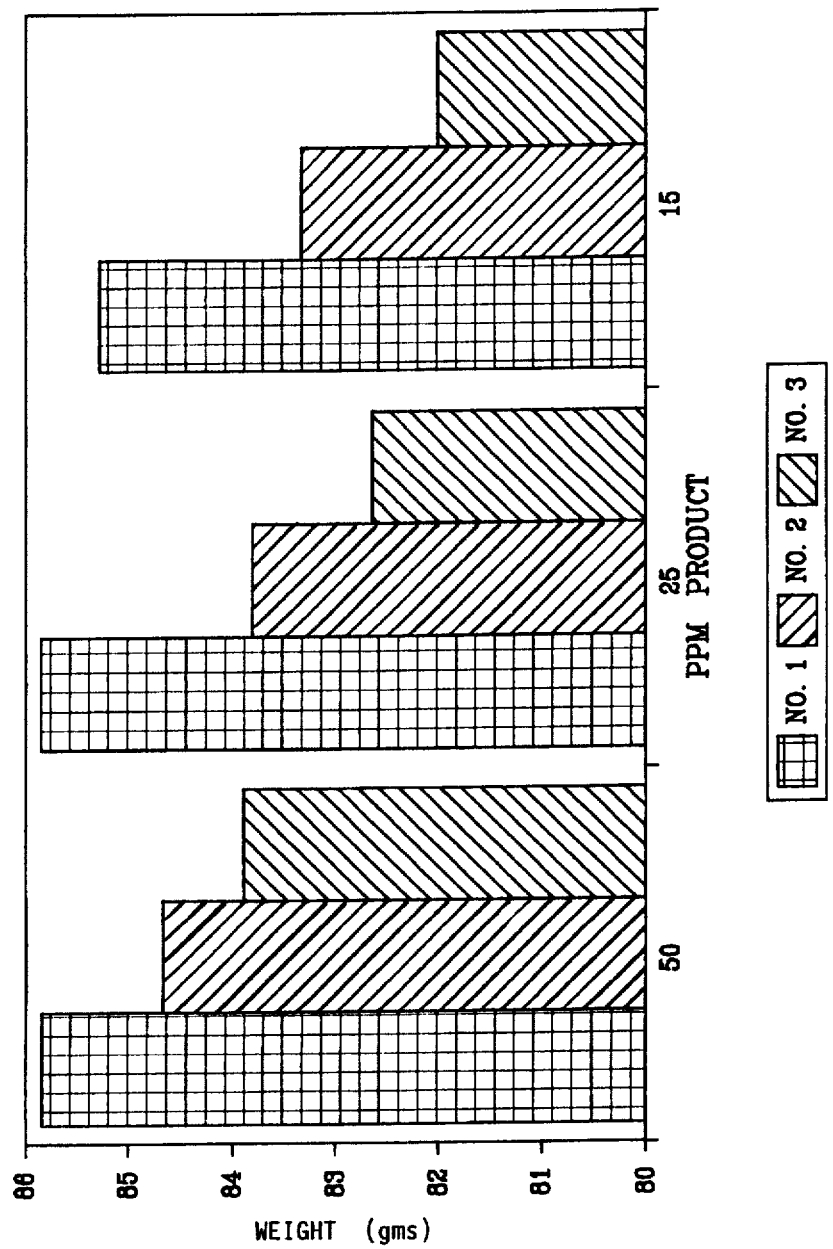

ANTIFORM COMPOSITION FOR AQUEOUS STARCH PAPER COATING SYSTEMS

FIELD OF THE INVENTION

The present invention relates to papermaking processing. Specifically, it relates to the process of applying a coating onto the already formed paper to enhance various surface characteristics.

BACKGROUND OF THE INVENTION

During papermaking, after the paper has been fabricated, a coating may be added to certain papers to enhance surface characteristics such as color, reflectivity and printability. Starch solutions are commonly employed. Foam is a consistent problem in these starch solutions and coatings. These types of systems tend to be different than typical wet-end paper systems. The primary difference is the absence of fiber. Additionally, whitewater systems generally exhibit low viscosities, 100 cps or less, while these surface modifying systems can range from 500 up to 1000 cps or higher. The high viscosity of these systems is necessary to reduce the amount of penetration into the paper and allow the control of applied coating weights. Also, some of these types of coatings, like starch solutions, require elevated temperatures (140° F. to 170° F.) as a viscosity and gellation control causing entrained or dispersed air to be more easily retained and more difficult to control in these systems than in wet-end paper machine white water systems. The high speed coaters used to apply these solutions/coatings have a tendency to entrain or disperse air into these types of systems. The air retained in these systems leads to higher viscosities in turn resulting in lighter coating weights.

Additionally, air bubbles in the coating cause holes in the coating surface resulting in loss of sheet surface properties, sizing and ink bleed through. In many paper manufacturing processes, a sizing agent is added to the wet-end of the paper machine to obtain water and/or ink hold-out properties. Sizing agents added at this point are difficult to control and produce side effects, such as deposition in felts and dryer hoods, slipperiness of the finished sheet, and agglomeration of fillers. In recent years, there has been a shift to modify sheet properties at the size press or other dry-end coating equipment. Application of starch at the dry-end has been known for a long time. In recent years, synthetic sizing agents are being added to the starch solution for modification of surface properties. This enables papermakers to better control sheet surface properties, as well as costs. The drawback to this approach is that these sizing agents, generally copolymers of styrene-acrylic acid, styrene-maleic anhydride, and polyurethanes or modifications of these, are extremely foamy. This adds to the already hard to control entrained air/foam that is generated in these systems.

Conventional defoamer/anti-foam compositions include ethylene (bis) stearamide (EBS), fatty alcohol, fatty acid or hydrophobic silica. Problems result from the use of these products because they are particulate and will aggravate deposition. Additionally, some defoamer/anti-foam products may include a hydrocarbon oil carrier. Such products are known to negatively effect paper sheet properties, such as brightness and sizing.

These and other problems associated with the use of conventional defoamer/anti-foamers in the starch or coating process of a papermaking operation are resolved by the present invention.

GENERAL DESCRIPTION OF THE INVENTION

Applicant has discovered that a composition comprising a polyether surfactant and polyethoxylated sorbitol hexaoleate performs highly effectively as a defoamer/anti-foamer in the solution used to coat paper in a papermaking operation. It exhibits exceptional performance when sizing agents have been added to the dry end of the operation. The excessive foam generated by these sizing agents can be effectively controlled by the addition of the inventive composition to the coating solution.

DETAILED DESCRIPTION OF THE DRAWINGS

FIG. 3 shows the ability of the present composition to prevent foaming under dynamic conditions.

DETAILED DESCRIPTION OF THE INVENTION

Figure 1:
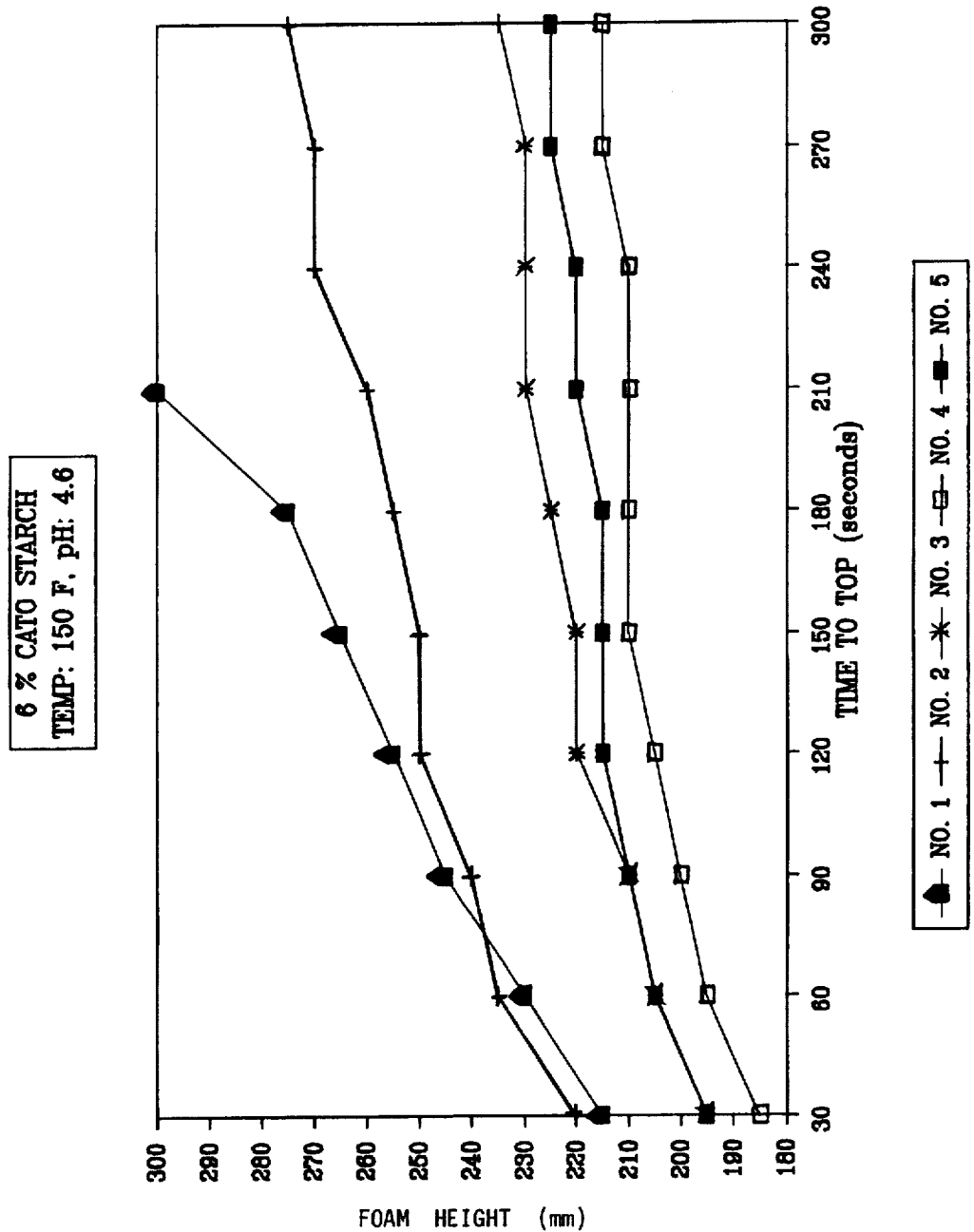
FIGS. 1 and 2 show the efficacy of the present invention as an anti-foaming agent in recirculation test cells.

The defoam/anti-foam agent of the present invention comprises a blend of a polyether surfactant and polyethoxylated sorbitol hexaoleate.

The polyether surfactant is derived from the propoxylation of propylene glycol followed by ethoxylation. The resulting product is an ethylene oxide/propylene oxide (EO/PO) block copolymer having an HLB in the range of 0.1–5, preferably 1–3. Its molecular weight is in the range of about 1000–4500. Such products are commercially available from BASF under the Pluronic® tradename.

The polyethoxylated sorbitol hexaoleate contains about 30 to 60 moles of ethylene oxide. Its HLB is in the range of 9–12 and its molecular weight is between about 3000 and 5000. It is commercially available from either Henkle under the Trylox tradename or ICI under the Atlas® tradename.

The defoam/anti-foam agent may be added to the coating solution at the make-up tank, run tank or at the coater. The coating solution generally contains starch. However, it may also consist of other materials, such as synthetic polymers and polyvinyl alcohol.

In making the defoam/anti-foam agent, from about 10–90%, by weight, of the polyether surfactant is added to about 10–50%, by weight, of the polyethoxylated sorbitol hexaoleate. The preferred ranges are: about 60–80%, by weight, of polyether surfactant and about 20–40%, by weight, of the polyethoxylated sorbitol hexaoleate.

The formulated defoam/anti-foam agent may be added to the aqueous coating solution in a concentration ranging from about 1.0 to 500 ppm, by weight. Preferably, the concentration ranges from about 10 to 100 ppm.

EXAMPLES

To illustrate the efficacy of the invention, a variety of pulp and paper processing waters are used as foaming media. The antifoams according to the invention can be used in aqueous paper processing foaming systems where the temperatures range from 20° C.–60° C., including, but not limited to, pulp and paper mill effluent, and recycled fiber tissue machine water.

In evaluating the antifoam efficacy, the medium is continuously circulated from a calibrated reservoir (0–295 cm) via a pump and is returned back to the reservoir. This action agitates the medium, which in turn causes foam. The test cell is filled with the medium at the desired operating temperature. The medium temperature can be held approximately constant with a set temperature controller and heat coil wrapped around the bottom cell reservoir. A known amount of the subject antifoam is introduced into the test cell medium before the pump is turned on. The pump and stop watch are started simultaneously and foam levels are recorded every 30 seconds until the foam reaches a maximum level of 295 cm or 300 seconds transpires, whichever occurs first. At this point the pump and stop watch are turned off and the time is recorded as the top time. A longer time required for the foam to reach a certain level indicates a more efficacious antifoam. Another method for evaluating anti-foam efficacy involves numerically integrating and obtaining the area under the foam height versus time curve for each sample. The smaller area under the curve usually indicates the ability of an antifoam to suppress or eliminate the foam better.

Example 1

A laboratory evaluation in the recalculation test cell was done with five defoamers. The compositions were as follows:

1) EBS in oil emulsion, water extended defoamer
2) Ethoxylated unsaturated fatty ester defoamer
3) EBS and silica in oil defoamer
4) Polyether surfactant*+polyethoxylated (40) sorbitol hexaoleate **
5) Polyether surfactant

*Pluronic L-101:3800 mw, HLB=1
**Mazon 1086:40 moles EO

The defoamers were tested at equal active levels. FIG. 1 shows that the blend (4) described in this invention is more effective than the single component (5) as well as another concentrate defoamer (2) and the two varieties of particle defoamers (1 and 3) in a starch solution.

Example 2

A laboratory evaluation using a recirculation test cell was done with four defoamers. The compositions were as follows:

1) EBS in oil emulsion, water-extended defoamer
2) Polyether surfactant*+polyethoxylated (40) sorbitol hexaoleate**
3) Ethoxylated unsaturated fatty ester defoamer
4) Fatty alcohol water-based defoamer

* Pluronic L-101
**Mazon 1086

Figure 2:
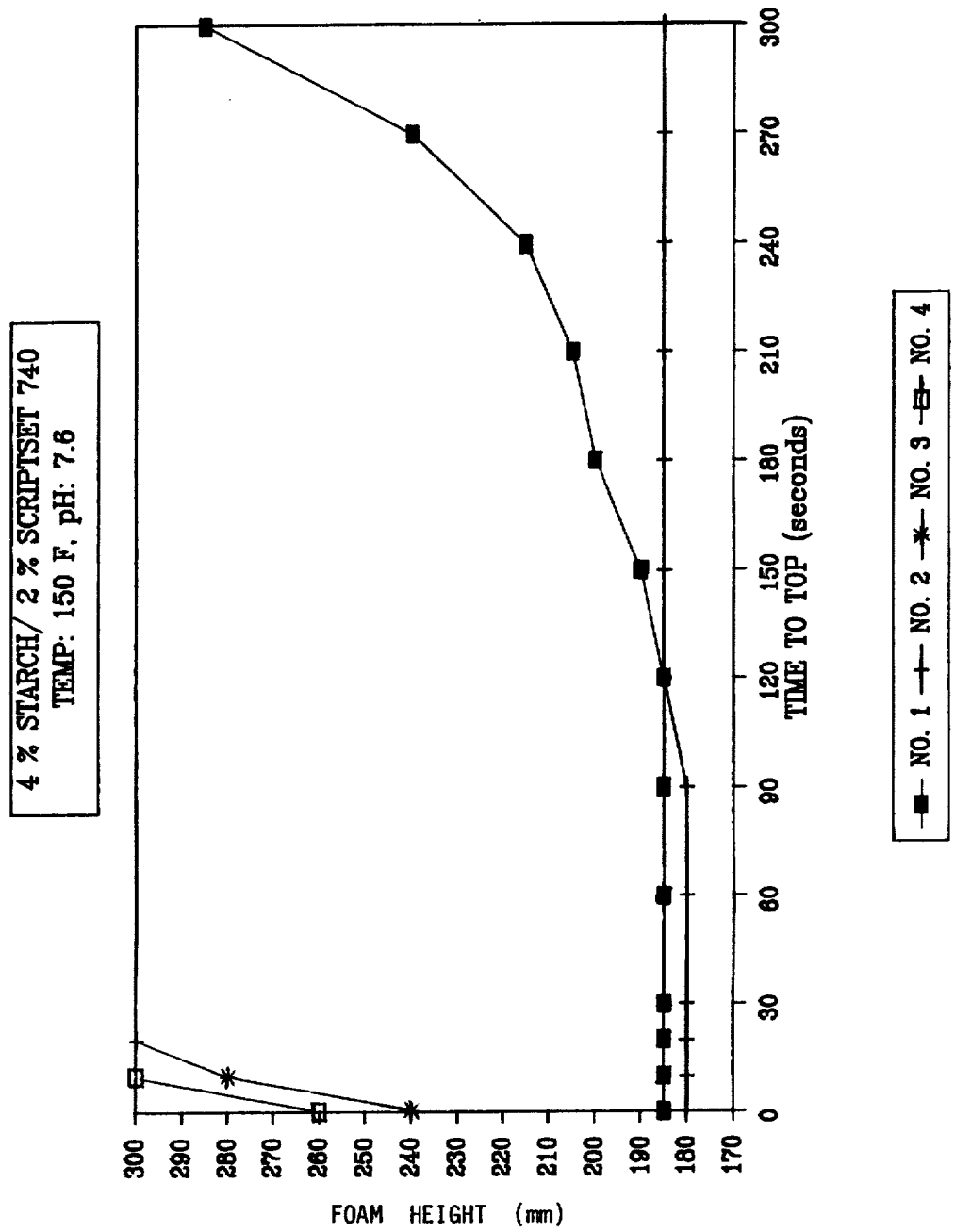

The defoamers were tested at equal active levels. FIG. 2 shows that the blend (2) described in this invention is more effective than another concentrated defoamer (3) and the two varieties of particle defoamers (1 and 4) in a solution of starch and a synthetic sizing agent (styrenemaleic anhydride ester ammonium salt).

Example 3

A laboratory evaluation was done on three defoamers. The test method used was to take a 1000 ml. sample of coating solution and compare the before and after mixing density with a weight per volume (density) cup on a balance. Mixing was done with a Kitchen Aid variable speed blender with wire whisk on a setting of 2 for one minute. The defoamer compositions were as follows:

1) Polyether surfactant*+polyethoxylated (40) sorbitol hexaoleate**
2) Blended surfactant defoamer
3) EO/PO fatty alcohol defoamer

* Pluronic L-101
**Mazon 1086

FIG. 3 shows that as the dosage of defoamer is reduced from 50 to 25 to 15 ppm, the blend (1) described in this invention maintains the highest density (lowest amount of entrained air) over two other concentrate defoamers (2 and 3) in a starch solution.

Having thus described the present invention, what I claim is:

1. A process for controlling foam in an aqueous starch, paper coating solution of a paper making operation having a temperature of about 140° F. or greater comprising adding to the coating solution a sufficient amount for the purpose of a defoam/antifoam agent consisting of from about 50–90%, by weight, of an ethylene oxide/propylene oxide copolymer having an HLB in the range of 0.1–5 and a molecular weight range between about 1000 and 4500, and from about 10–50%, by weight, of polyethoxylated sorbitol hexaoleate containing about 30 to 60 moles of ethylene oxide, having an HLB in the range of 9–12 and having a molecular weight between 3000 and 5000.

2. The process of claim 1 wherein approximately 1.0 to 500 ppm, by weight, of the defoam/anti-foam agent is added to the coating solution.

* * * * *